(12) United States Patent
Hwang et al.

(10) Patent No.: US 12,215,176 B2
(45) Date of Patent: Feb. 4, 2025

(54) METHOD FOR PREPARING POLYMER

(71) Applicant: LG CHEM, LTD., Seoul (KR)

(72) Inventors: Jeong A Hwang, Daejeon (KR); Dae Young Shin, Daejeon (KR); Eun Jung Joo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 456 days.

(21) Appl. No.: 17/627,568

(22) PCT Filed: Jul. 1, 2021

(86) PCT No.: PCT/KR2021/008314
§ 371 (c)(1),
(2) Date: Jan. 14, 2022

(87) PCT Pub. No.: WO2022/014910
PCT Pub. Date: Jan. 20, 2022

(65) Prior Publication Data
US 2023/0331885 A1  Oct. 19, 2023

(30) Foreign Application Priority Data
Jul. 17, 2020 (KR) .................... 10-2020-0088684

(51) Int. Cl.
*C08F 212/10* (2006.01)
*B01D 53/00* (2006.01)
*C08F 6/00* (2006.01)
*C08F 6/12* (2006.01)

(52) U.S. Cl.
CPC .......... *C08F 212/10* (2013.01); *B01D 53/002* (2013.01); *C08F 6/003* (2013.01); *C08F 6/12* (2013.01); *B01D 2257/708* (2013.01)

(58) Field of Classification Search
CPC .......... C08F 212/10; C08F 6/003; C08F 6/12; B01D 53/002; B01D 2257/708
See application file for complete search history.

(56) References Cited

FOREIGN PATENT DOCUMENTS

| CN | 103836833 A | * | 6/2014 |
|---|---|---|---|
| CN | 205216414 U | * | 5/2016 |
| CN | 208372511 U | * | 1/2019 |
| JP | 2008111119 A | | 5/2008 |
| JP | 4437930 B2 | | 3/2010 |
| KR | 2013-0009099 A | | 1/2013 |
| KR | 20160048011 A | | 5/2016 |
| KR | 20180092403 A | | 8/2018 |
| KR | 2018100092403 A | * | 8/2018 |
| KR | 10-2057361 B1 | | 12/2019 |
| KR | 10-2020-0075718 A | | 6/2020 |
| KR | 2020100075718 A | * | 6/2020 |

* cited by examiner

*Primary Examiner* — Robert D Harlan

(57) ABSTRACT

Provided is a method of preparing a polymer including: supplying a monomer stream and a solvent stream to a reactor and performing a polymerization reaction to prepare a reaction product; supplying a reactor discharge stream to a volatilization device, separating a polymer from a lower portion of the volatilization device, splitting an upper discharge stream including an unreacted monomer, a solvent, and an inert gas into two or more streams, and divisionally supplying the split streams to a plurality of condensers, respectively; condensing and separating the unreacted monomer and the solvent in each of the condensers and supplying a gaseous stream therefrom to a condenser installed at a rear end of each condenser; and supplying a gaseous stream discharged from a condenser installed at the rearmost end to a vacuum unit.

12 Claims, 1 Drawing Sheet

[FIG. 1]
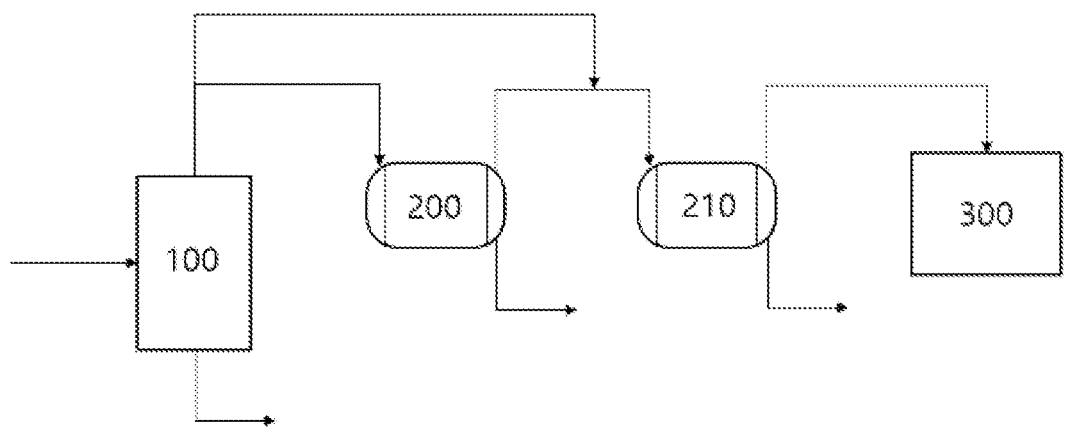
[FIG. 2] [Prior Art]
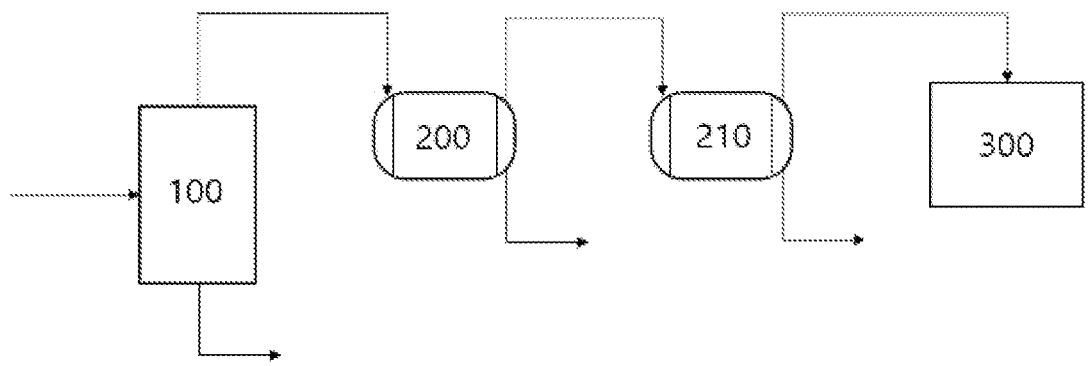

METHOD FOR PREPARING POLYMER

CROSS-REFERENCE TO RELATED APPLICATIONS

The present application claims the benefit of priority to Korean Patent Application No. 10-2020-0088684, filed on Jul. 17, 2020, the entire contents of which are incorporated herein as a part of the specification.

TECHNICAL FIELD

The present invention relates to a method of preparing a polymer, and more particularly, to a method of separating a polymer from VOC components, for example, a reaction product including an unreacted monomer, a solvent, and the like and efficiently recovering the VOC components.

BACKGROUND ART

Recovery of volatile components such as volatile organic compounds (VOC) from a flowable substance is an essential step in various industrial processes including preparation of various polymers. For example, when a polymer is prepared using a monomer, the polymer is separated from a reaction product including the polymer and VOC components, for example, an unreacted monomer and a solvent, and the VOC components should be recovered.

Usually, since it takes a long time for VOC components confined in the polymer to diffuse from the polymer to the surface and move in a gaseous phase, recovery of the VOC components is performed under high temperature and high vacuum conditions. However, since a very low condensation temperature is required to condense the VOC components under a high vacuum condition, an overload on a freezer is caused in the process of condensing vaporized VOC components to be recovered in a reactor.

DISCLOSURE

Technical Problem

In order to solve the problems mentioned in the Background Art, an object of the present invention is to provide a method allowing VOC components to be effectively recovered from flowable substances such as a reaction product and reducing energy consumption by increasing a condensation efficiency in the process of condensing and recycling the recovered VOC components.

Technical Solution

In one general aspect, a method of preparing a polymer includes: supplying a monomer stream and a solvent stream to a reactor and performing a polymerization reaction to prepare a reaction product; supplying a reactor discharge stream to a volatilization device, separating a polymer from a lower portion of the volatilization device, splitting an upper discharge stream including an unreacted monomer, a solvent, and an inert gas into two or more streams, and divisionally supplying the split streams to a plurality of condensers, respectively; condensing and separating the unreacted monomer and the solvent in each of the condensers and supplying a gaseous stream therefrom to a condenser installed at a rear end of each condenser; and supplying a gaseous stream discharged from a condenser installed at the rearmost end to a vacuum unit.

Advantageous Effects

According to the method of preparing a polymer of the present invention, VOC components may be effectively recovered from flowable substances such as a reaction product, and a condensation efficiency is increased without improvement of a facility or utility in a process of condensing and recycling the recovered VOC components, whereby a recovered amount of VOC may be increased to reduce raw material costs and wastewater treatment costs.

DESCRIPTION OF DRAWINGS

FIG. 1 is a process flow diagram according to the method of preparing a polymer in the exemplary embodiment of the present invention.

FIG. 2 is a process flow diagram according to the method of preparing a polymer in the Comparative Example.

BEST MODE

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

In the present invention, the term "stream" may refer to a fluid flow in a process, or may refer to a fluid itself flowing in a pipe. Specifically, the "stream" may refer to both a fluid itself flowing in a pipe connecting each apparatus and a fluid flow. In addition, the fluid may refer to a gas, a liquid, and the like.

Hereinafter, the present invention will be described in more detail for better understanding of the present invention, with reference to FIG. 1.

According to the present invention, a method of preparing a polymer is provided. More specifically, in the preparation of a polymer, a method of increasing a condensation efficiency of VOC components to increase a recovered amount may be provided. The method of preparing a polymer may include: supplying a monomer stream and a solvent stream to a reactor and performing a polymerization reaction to prepare a reaction product; supplying a reactor discharge stream to a volatilization device 100, separating a polymer from a lower portion of the volatilization device 100, splitting an upper discharge stream including an unreacted monomer, a solvent, and an inert gas into two or more streams, and divisionally supplying the split streams to a plurality of condensers, respectively; condensing and separating the unreacted monomer and the solvent in each of the condensers and supplying a gaseous stream therefrom to a condenser installed at a rear end of each condenser; and supplying a gaseous stream discharged from a condenser installed at the rearmost end to a vacuum unit 300.

The polymer may be produced by supplying a monomer stream and a solvent stream to a reactor and performing a polymerization reaction. Specifically, a reaction product including a polymer and VOC components such as an unreacted monomer and a solvent may be prepared by the polymerization reaction.

The polymer may include an aromatic vinyl-unsaturated nitrile-based copolymer. For example, when the polymer is the aromatic vinyl-unsaturated nitrile-based copolymer, the monomer stream may include an aromatic vinyl-based monomer and an unsaturated nitrile-based monomer.

The aromatic vinyl-based monomer may be, for example, one or more selected from the group consisting of styrene, α-methylstyrene, p-bromostyrene, p-methylstyrene, p-chlorostyrene, and o-bromostyrene, and more specifically styrene.

The addition, the unsaturated nitrile-based monomer may be one or more selected from the group consisting of acrylonitrile, methacrylonitrile, ethacrylonitrile, phenylacrylonitrile, and α-chloroacrylonitrile, and specifically acrylonitrile.

The monomer stream may include the aromatic vinyl-based monomer and the unsaturated nitrile-based monomer at a weight ratio of 65:35 to 78:22. When the monomer stream including the aromatic vinyl-based monomer and the unsaturated nitrile-based monomer within the range is supplied to the reactor and the aromatic vinyl-unsaturated nitrile-based copolymer is prepared, a polymerization conversion rate is increased and the mechanical strength, thermal resistance, and surface properties of the prepared copolymer may be improved. In addition, when the content of the aromatic vinyl-based monomer satisfies the above content range, an appropriate polymerization rate may be maintained and the thermal resistance of the prepared copolymer may be improved.

The solvent may include one or more selected from the group consisting of alcohols; aromatic hydrocarbons such as petroleum ether and ethylbenzene; and halides such as carbon tetrachloride and chloroform; ketone-based compounds such as methylethylketone. The solvent stream may be supplied at 10 parts by weight to 30 parts by weight with respect to a total of 100 parts by weight of the monomer stream. When the solvent stream is supplied within the range, an appropriate viscosity for the polymerization reaction is maintained and the physical properties of the produced polymer are effectively controlled, so that productivity may be improved.

According to an exemplary embodiment of the present invention, the reactor may be further supplied with a polymerization initiator stream. The polymerization initiator may include one or more selected from the group consisting of 2,2-bis(4,4-di-t-butylperoxy cyclohexane)propane, 1,1-bis(t-butylperoxy)-3,3,5-trimethylcyclohexane, 1,1-bis(t-hexylperoxy)-3,3,5-trimethylcyclohexane, 1,1-bis(t-butylperoxy)-2-methylcyclohexane, 1,1-bis(t-hexylperoxy) cyclohexane, 1,1-bis(t-butylperoxy)cyclohexane, and t-hexylperoxyisopropyl monocarbonate, and the polymerization initiator stream may be supplied at 0.01 parts by weight to 0.1 parts by weight with respect to a total of 100 parts by weight of the monomer stream.

The polymerization reaction may be performed at a temperature of 100° C. to 180° C., 100° C. to 150° C., or 115° C. to 135° C. When the temperature of the polymerization reaction is adjusted to the range, production of an oligomer during polymerization may be decreased.

The operation pressure of the reactor may be 0.5 kg/cm$^2$G to 5 kg/cm$^2$G, 1.5 kg/cm$^2$G to 4 kg/cm$^2$G, or 2.5 kg/cm$^2$G to 3 kg/cm$^2$G. An inert gas may be used for controlling the pressure within the range. Here, the inert gas may include one or more selected from the group consisting of nitrogen ($N_2$) and argon (Ar), and as a specific example, the inert gas may be nitrogen ($N_2$).

A part of the inert gas may be dissolved in the reaction product and supplied to a volatilization device 100 described layer. The content of the inert gas may be 100 ppm to 800 ppm, 150 ppm to 700 ppm, or 150 ppm to 550 ppm with respect to the total content of the reaction product.

According to an exemplary embodiment of the present invention, a reactor discharge stream including the reaction product is supplied to the volatilization device 100, a polymer is separated from a lower portion of the volatilization device 100, and an upper discharge stream including an unreacted monomer, a solvent, and an inert gas is split into two or more streams and divisionally supplied to a plurality of condensers, respectively. For example, the upper discharge stream from the volatilization device 100 may be split into a first stream and a second stream, the first stream being supplied to a first condenser 200 and the second stream being supplied to a second condenser 210.

The operation pressure of the volatilization device 100 may be, for example, 5 torr to 70 torr, 20 torr to 60 torr, or 40 torr to 55 torr. By operating the volatilization device 100 in the condition of the pressure range, the VOC components including the polymer, the unreacted monomer, and the solvent may be effectively separated while suppressing a side reaction. Specifically, when the operation pressure is fixed due to the facility limitation of a vacuum unit 300, the operation pressure of the volatilization device 100 may be determined depending on a pressure drop in piping and a facility between the volatilization device 100 and the vacuum unit 300. Here, in the present invention, the VOC components are volatilized as much as possible in the volatilization device 100, while the condensation efficiency of the second condenser 210, thereby decreasing a gas flow rate including the VOC components supplied to the vacuum unit 300 to lower a pressure drop, and thus, the operation pressure of the volatilization device 100 is lowered to increase a vacuum degree to increase a separation efficiency in the volatilization device 100. Thus, the content of the VOC components in the polymer separated from the volatilization device 100 is minimized.

The operation temperature of the volatilization device 100 may be 100° C. to 400° C., 120° C. to 350° C., or 150° C. to 300° C. By operating the volatilization device 100 at the temperature in the above range, the unreacted monomer, the solvent, and the inert gas may be effectively separated from the upper discharge stream from the volatilization device 100, and when the upper discharge stream from the volatilization device 100 is supplied to the condenser described later and condensed, a condensation efficiency may be increased and energy consumed in this process may be minimized.

In the volatilization device 100, the stream may be separated into the lower discharge stream including the polymer and the upper discharge stream including the unreacted monomer, the solvent, and the inert gas.

The upper discharge stream from the volatilization device 100 may include 10 wt % to 95 wt %, 20 wt % to 80 wt %, or 30 wt % to 70 wt % of the unreacted monomer, 5 wt % to 60 wt %, 10 wt % to 50 wt %, or 10 wt % to 40 wt % of the solvent, and 100 ppm to 800 ppm, 150 ppm to 700 ppm, or 150 ppm to 550 ppm of the inert gas.

The upper discharge stream including the unreacted monomer, the solvent, and the inert gas may be condensed using a condenser and recovered. As such, when the inert gas is introduced to the condenser with the VOC components such as the unreacted monomer and the solvent, a condensation efficiency is decreased.

Conventionally, the VOC components were recovered using one condenser using cooling water which is advantageous in terms of costs as a refrigerant for recovering the VOC components from the upper discharge stream from the volatilization device, but when a vacuum degree was very high, there was a limitation in condensing all VOC components.

In addition, in order to solve the problem, a study on a process for improving a VOC recovery rate was performed, in which two condensers are used for recovering VOC components from an upper discharge stream from a volatilization device using a refrigerant which is higher-priced but at a lower temperature than cooling water, for example, brine, and condensation is performed using low-priced cooling water in a first condenser and residual VOC components which have not been condensed in the first condenser are condensed using a solvent which is at a lower temperature than cooling water in a second condenser. However, in this case, the unreacted monomer and the solvent are condensed a lot to increase the content of the inert gas in the stream supplied to the second condenser installed at the rear end and the condensation efficiency of the second condenser is decreased to increase a used amount of process water used in the vacuum unit at the rear end of the second condenser, thereby increasing wastewater treatment costs. In addition, since the boiling point of the inert gas is low, there is a limitation in lowering a refrigerant temperature and increasing the recovery rate of the unreacted monomer and the solvent due to the exchange of the condenser or the like.

Regarding this, in the present invention, in order to solve the problem, the upper discharge stream from the volatilization device 100 is split and divisionally supplied to the first condenser 200 and the second condenser 210, thereby decreasing the content of the inert gas in the stream supplied to the second condenser 210 to prevent a decrease in the condensation efficiency of the second condenser 210. Thus, the recovery amounts of the unreacted monomer and the solvent are increased without improvement of additional facilities or utilities to reduce raw material costs, and the used amount of the process water in the vacuum unit 300 at the rear end of the second condenser 210 is decreased to reduce wastewater treatment costs.

According to an exemplary embodiment of the present invention, the upper discharge stream from the volatilization device 100 may be split into a first stream and a second stream, the first stream being supplied to the first condenser 200 and the second stream being supplied to the second condenser 210.

A flow rate ratio of the second stream may be 0.1% to 50%, 1% to 40%, or 1% to 30% with respect to the total flow rate ratio of the upper discharge stream. By splitting the upper discharge stream from the volatilization device 100 into the first stream and the second stream within the range and divisionally supplying the split streams to the first condenser 200 and the second condenser 210, respectively, efficiency decrease of the second condenser 210 may be prevented.

The first stream of the upper discharge stream from the volatilization device 100 is supplied to the first condenser 200, the first condenser 200 is supplied with a first upper discharge stream of the volatilization device 100, the unreacted monomer and the solvent are separated by condensation, and the remaining gaseous stream may be supplied to the second condenser 210.

The first condenser 200 is supplied with the first stream of the upper discharge stream from the volatilization device 100 and condenses the first stream using a refrigerant, the condensed unreacted monomer and solvent are separated and recovered, and the gaseous stream which has not been condensed in the first condenser 200 may be supplied to the second condenser 210. Here, the contents of the unreacted monomer and the solvent condensed in the first condenser 200 may be 70 wt % to 99 wt %, 75 wt % to 90 wt %, or 80 wt % to 90 wt % with respect to the total content of the unreacted monomer and the solvent included in the first stream of the upper discharge stream from the volatilization device 100.

The content of the inert gas in the gaseous stream discharged from the first condenser 200 may be 1,000 ppm to 20,000 ppm, 2,000 ppm to 18,000 ppm, or 3,000 ppm to 16,500 ppm. As such, when the gaseous stream discharged from the first condenser 200 having a high inert gas content is supplied to the second condenser 210, the condensation efficiency of the second condenser 210 may be decreased. Therefore, in the present invention, the second stream split from the upper discharge stream from the volatilization device 100 may be further supplied to the second condenser 210 together with the gaseous stream discharged from the first condenser 200.

The refrigerant supplied to the first condenser 200 may include, for example, cooling water, and the refrigerant may have a temperature of 20° C. to 40° C., 23° C. to 38° C., or 25° C. to 35° C. and a flow rate of 50 ton/hr to 200 ton/hr or 100 ton/hr to 180 ton/hr.

A gaseous stream which has not been condensed in the first condenser 200 may be supplied to the second condenser 210 and further condensed. Here, the second condenser 210 may be further supplied with a second stream of the upper discharge stream from the volatilization device 100 together with the gaseous stream which has not been condensed in the first condenser 200.

The second condenser 210 is supplied with the second stream of the upper discharge stream from the volatilization device 100 and the gaseous stream discharged from the first condenser 200 and condenses and separates the unreacted monomer and the solvent, and the remaining stream may be supplied to a vacuum unit 300.

The second stream of the upper discharge stream from the volatilization device 100 and the gaseous stream discharged from the first condenser 200 may be supplied to the second condenser 210 as a separate stream, or may form a mixed stream and be supplied to the second condenser 210. Specifically, the second stream of the upper discharge stream from the volatilization device 100 and the gaseous stream discharged from the first condenser 200 form a mixed stream and the mixed stream may be supplied to the second condenser 210. Here, the content of the inert gas in the mixed stream may be 500 ppm to 15,000 ppm, 1,000 ppm to 12,000 ppm, or 1,000 ppm to 11,000 ppm. In addition, the content of the inert gas in the mixed stream may be lower than the content of the inert gas in the gaseous stream discharged from the first condenser 200 by 100 ppm or more, 500 ppm to 15,000 ppm, or 5,000 ppm to 15,000 ppm.

When the gaseous stream discharged from the first condenser 200 having a high content of the inert gas is supplied alone to the second condenser 210, the condensation efficiency of the second condenser 210 may be lowered, but in the present invention, the second stream of the upper discharge stream from the volatilization device 100 and the gaseous stream discharged from the first condenser 200 are mixed and the mixed stream is supplied to the second condenser 210 in the state in which the content of the inert gas is lowered by 100 ppm or more as compared with the content of the inert gas in the gaseous stream discharged from the first condenser 200, thereby preventing a decrease in the condensation efficiency of the second condenser 210. Therefore, when the condensation efficiency of the second condenser 210 is decreased, the condensation efficiency of VOC components may be increased without further facilities or utility improvement, such as using a refrigerant at a lower temperature or increasing a condenser size for increasing a condensation efficiency.

The contents of the unreacted monomer and the solvent condensed in the second condenser 210 may be 70 wt % to 99 wt %, 75 wt % to 90 wt %, or 80 wt % to 90 wt % with respect to the total content of the unreacted monomer and the solvent which have been included in the mixed stream.

The refrigerant supplied to the second condenser 210 may include, for example, cooling water, and the refrigerant may have a temperature of 5° C. to 15° C. or 7° C. to 13° C. and a flow rate of 10 ton/hr to 100 ton/hr or 30 ton/hr to 70 ton/hr.

The contents of the unreacted monomer and the solvent condensed in the first condenser 200 and the second condenser 210 may be 70 wt % to 99 wt %, 85 wt % to 99 wt %, or 90 wt % to 99 wt % with respect to the total content of the unreacted monomer and the solvent included in the upper discharge stream from the volatilization device 100. As such, it may be confirmed that the recovery amount of the unreacted monomer and the solvent included in the upper discharge stream from the volatilization device 100 is very high, by increasing the condensation efficiency of the second condenser 210.

According to an exemplary embodiment of the present invention, the gaseous stream which has not been condensed in the second condenser 210 may be supplied to a vacuum unit 300. Specifically, the gaseous stream which has not been condensed in the second condenser 210 may be introduced to a water cooling type pump of the vacuum unit to pass through a wastewater treatment system.

As described above, by splitting the upper discharge stream from the volatilization device 100 into two or more streams and divisionally supplying the split streams to a plurality of condensers, a decrease in the condensation efficiency of each condenser may be prevented, thereby increasing the amounts of the unreacted monomer and the solvent recovered in each condenser. Accordingly, the amount of process water used in the vacuum unit 300 is decreased to decrease a water generation amount.

Hereinabove, the method of preparing a polymer according to the present invention has been described and illustrated in the drawings, but the description and the illustration in the drawings are the description and the illustration of only core constitutions for understanding of the present invention, and in addition to the process and apparatus described above and illustrated in the drawings, the process and the apparatus which are not described and illustrated separately may be appropriately applied and used for carrying out the method of preparing a polymer according to the present invention.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Examples 1 to 9

As shown in FIG. 1, a polymer, an unreacted monomer, and a solvent were separated from a reaction product and recovered.

Specifically, a reaction product including a styrene-acrylonitrile (SAN) copolymer as a polymer, an unreacted monomer, a solvent, and nitrogen was supplied to a volatilization device 100, and the polymer was separated from a lower portion and the unreacted monomer, the solvent, and the nitrogen were separated from an upper discharge stream.

The upper discharge stream from the volatilization device 100 was split into a first stream and a second stream, which were divisionally supplied to a first condenser 200 and a second condenser 210, respectively.

The first condenser 200 condensed the first stream from the volatilization device 100 while supplying a refrigerant at 30° C. at 150 ton/hr, the condensed stream was discharged, and the uncondensed gaseous stream was supplied to the second condenser 210 together with the second stream of the upper discharge stream from the volatilization device 100.

The second condenser 210 condensed the supplied stream by supplying a refrigerant at 10° C. at 50 ton/hr, the condensed stream was discharged, and the uncondensed gaseous stream was supplied to a vacuum unit 300.

At this time, (1) the nitrogen content (ppm) in the reaction product, (2) the flow rate ratio (%) of the second stream with respect to the total flow rate of the upper discharge stream of the volatilization device 100, (3) the nitrogen content (ppm) in the gaseous stream discharged from the first condenser 200, (4) the nitrogen content (ppm) in the stream supplied to the second condenser 210, (5) the operation pressure (torr) of the volatilization device 100, (6) the operation pressure (torr) of the vacuum unit 300, (7) the pressure drop (torr) from the volatilization device 100 to the vacuum unit 300, (8) the content (ppm) of the unreacted monomer and the solvent in the polymer, and (9) the flow rate (kg/hr) of the unreacted monomer and the solvent supplied to the vacuum unit 300 were measured and are shown in the following Table 1.

Comparative Examples

Comparative Examples 1 to 3

As shown in FIG. 2, a polymer, an unreacted monomer, and a solvent were separated from a reaction product and recovered.

Specifically, a reaction product including a styrene-acrylonitrile (SAN) copolymer as a polymer, an unreacted monomer, a solvent, and nitrogen was supplied to a volatilization device 100, and the polymer from a lower portion was separated and the unreacted monomer, the solvent, and the nitrogen were separated from an upper discharge stream.

The upper discharge stream from the volatilization device 100 was supplied to the first condenser 200, and the upper discharge stream from the volatilization device 100 was condensed while a refrigerant at 30° C. was supplied at 150 ton/hr in the first condenser 200, a condensed stream was discharged, and an uncondensed gaseous stream was supplied to the second condenser 210.

The second condenser 210 condensed the supplied stream by supplying a refrigerant at 10° C. at 50 ton/hr, the condensed stream was discharged, and the uncondensed gaseous stream was supplied to a vacuum unit 300.

At this time, (1) the nitrogen content (ppm) in the reaction product, (2) the flow rate ratio (%) of the second stream with respect to the total flow rate of the upper discharge stream of the volatilization device 100, (3) the nitrogen content (ppm) in the gaseous stream discharged from the first condenser 200, (4) the nitrogen content (ppm) in the stream supplied to the second condenser 210, (5) the operation pressure (torr) of the volatilization device 100, (6) the operation pressure (torr) of the vacuum unit 300, (7) the pressure drop (torr) from the volatilization device 100 to the vacuum unit 300, (8) the content (ppm) of the unreacted monomer and the solvent in the polymer, and (9) the flow rate (kg/hr) of the unreacted monomer and the solvent supplied to the vacuum unit 300 were measured and are shown in the following Table 1.

TABLE 1

|     | Example |  |  |  |  |  |  |  |  | Comparative Examples |  |  |
| --- | --- | --- | --- | --- | --- | --- | --- | --- | --- | --- | --- | --- |
|     | 1 | 2 | 3 | 4 | 5 | 6 | 7 | 8 | 9 | 1 | 2 | 3 |
| (1) | 500 | 500 | 500 | 500 | 500 | 500 | 200 | 200 | 200 | 500 | 500 | 200 |
| (2) | 5 | 10 | 20 | 5 | 10 | 30 | 1 | 5 | 10 | — | — | — |
| (3) | 15976 | 15922 | 16365 | 8063 | 8055 | 8422 | 3322 | 3323 | 3314 | 16318 | 8074 | 3321 |
| (4) | 10925 | 8287 | 5643 | 6670 | 5683 | 3624 | 3185 | 2732 | 2315 | 16318 | 8074 | 3321 |
| (5) | 50.7 | 50.0 | 49.3 | 45.3 | 44.8 | 43.4 | 45.4 | 45.0 | 44.5 | 51.4 | 45.8 | 45.5 |
| (6) | 40.0 | 40.0 | 40.0 | 30.0 | 30.0 | 30.0 | 30.0 | 30.0 | 30.0 | 40.0 | 30.0 | 30.0 |
| (7) | 10.7 | 10.0 | 9.3 | 15.3 | 14.8 | 13.5 | 15.4 | 15.0 | 14.5 | 11.5 | 15.8 | 15.5 |
| (8) | 2040 | 2013 | 1979 | 1808 | 1787 | 1727 | 1819 | 1802 | 1781 | 2074 | 1830 | 1823 |
| (9) | 31 | 25 | 21 | 134 | 116 | 103 | 98 | 68 | 56 | 47 | 174 | 113 |

Referring to Table 1, when comparing Examples 1 to 3 with Comparative Example 1, in which the specification was set to the nitrogen content in the reaction product of 500 ppm and the operation pressure of the vacuum unit 300 of 40.0 torr, it was confirmed that in Examples 1 to 3 in which the upper discharge stream from the volatilization device 100 was split and divisionally supplied to the first condenser 200 and the second condenser 210, respectively, a nitrogen content in the stream supplied to the second condenser 210 was decreased to increase a condensation efficiency, and thus, a stream flow rate supplied to the vacuum unit 300 was decreased. In this case, an uncondensed gas flow rate in the first condenser 200 and the second condenser 210 between the volatilization device 100 and the vacuum unit 300 was decreased to lower a pressure drop from the volatilization device 100 to the vacuum unit 300, and thus, a separation efficiency was increased due to an operation pressure decrease of the volatilization device 100, and the contents of the unreacted monomer and the solvent in the polymer separated in the volatilization device 100 may be decreased.

In addition, when comparing Examples 4 to 6 with Comparative Example 2, in which the specification was set to the nitrogen content in the reaction product of 500 ppm and the operation pressure of the vacuum unit 300 of 30.0 torr, it was confirmed that in Examples 4 to 6 in which the upper discharge stream from the volatilization device 100 was split and divisionally supplied to the first condenser 200 and the second condenser 210, respectively, a nitrogen content in the stream supplied to the second condenser 210 was decreased to increase a condensation efficiency, and thus, a stream flow rate supplied to the vacuum unit 300 was decreased. In this case, an uncondensed gas flow rate in the first condenser 200 and the second condenser 210 between the volatilization device 100 and the vacuum unit 300 was decreased to lower a pressure drop from the volatilization device 100 to the vacuum unit 300, and thus, a separation efficiency was increased due to an operation pressure decrease of the volatilization device 100, and the contents of the unreacted monomer and the solvent in the polymer separated in the volatilization device 100 may be decreased.

In addition, when comparing Examples 7 to 9 with Comparative Example 3, in which the specification was set to the nitrogen content in the reaction product of 200 ppm and the operation pressure of the vacuum unit 300 of 30.0 torr, it was confirmed that in Examples 7 to 9 in which the upper discharge stream from the volatilization device 100 was split and divisionally supplied to the first condenser 200 and the second condenser 210, respectively, a nitrogen content in the stream supplied to the second condenser 210 was decreased to increase a condensation efficiency, and thus, a stream flow rate supplied to the vacuum unit 300 was decreased. In this case, an uncondensed gas flow rate in the first condenser 200 and the second condenser 210 between the volatilization device 100 and the vacuum unit 300 was decreased to lower a pressure drop from the volatilization device 100 to the vacuum unit 300, and thus, a separation efficiency was increased due to an operation pressure decrease of the volatilization device 100, and the contents of the unreacted monomer and the solvent in the polymer separated in the volatilization device 100 may be decreased.

The invention claimed is:

1. A method of preparing a polymer, the method comprising:
   supplying a monomer stream and a solvent stream to a reactor and performing a polymerization reaction to prepare a reaction product;
   supplying a reactor discharge stream to a volatilization device comprising the reaction product, separating a polymer from a lower portion of the volatilization device, and splitting an upper discharge stream including an unreacted monomer, a solvent, and an inert gas into two or more streams comprising a first stream and a second stream;
   supplying the first stream to a first condenser and the second stream to a second condenser;
   at the first condenser, condensing and separating unreacted monomer and solvent and supplying a third gaseous stream to the second condenser; and
   supplying a gaseous stream discharged from the second condenser to a vacuum unit.

2. The method of preparing a polymer of claim 1, wherein the first condenser is supplied with the first upper discharge stream from the volatilization device and condenses and separates the unreacted monomer and the solvent, and a remaining gaseous stream is supplied to the second condenser as the third gaseous stream, and the second condenser is provided with the second stream of the upper discharge stream from the volatilization device and the third gaseous stream discharged from the first condenser and condenses and separates the unreacted monomer and the solvent, and a remaining gaseous stream is supplied to the vacuum unit as the gaseous stream discharged from the second condenser.

3. The method of preparing a polymer of claim 2, wherein a flow rate ratio of the second stream is 0.1% to 50% with respect to a total flow rate of the upper discharge stream from the volatilization device.

4. The method of preparing a polymer of claim 3, wherein the flow rate ratio of the second stream is 1% to 30% with respect to the total flow rate of the upper discharge stream from the volatilization device.

5. The method of preparing a polymer of claim 1, wherein the upper discharge stream from the volatilization device includes 10 wt % to 95 wt % of the unreacted monomer, 5 wt % to 60 wt % of the solvent, and 100 ppm to 800 ppm of the inert gas.

6. The method of preparing a polymer of claim 2, wherein a content of the inert gas in the third gaseous stream discharged from the first condenser is 1,000 ppm to 20,000 ppm.

7. The method of preparing a polymer of claim 2, wherein the second stream of the upper discharge stream from the volatilization device and the third gaseous stream discharged from the first condenser form a mixed stream and the mixed stream is supplied to the second condenser.

8. The method of preparing a polymer of claim 7, wherein a content of the inert gas in the mixed stream is 500 ppm to 15,000 ppm.

9. The method of preparing a polymer of claim 8, wherein the content of the inert gas in the mixed stream is lower than the content of the inert gas in the third gaseous stream discharged from the first condenser by 100 ppm or more.

10. The method of preparing a polymer of claim 2, wherein a refrigerant supplied to the first condenser has a temperature of 20° C. to 40° C. and a flow rate of 50 ton/hr to 200 ton/hr.

11. The method of preparing a polymer of claim 2, wherein a refrigerant supplied to the second condenser has a temperature of 5° C. to 15° C. and a flow rate of 10 ton/hr to 100 ton/hr.

12. The method of preparing a polymer of claim 1, wherein the polymer includes an aromatic vinyl-unsaturated nitrile-based copolymer.

* * * * *